United States Patent
Tangye et al.

(10) Patent No.: US 10,569,864 B2
(45) Date of Patent: Feb. 25, 2020

(54) AIRCRAFT STEERING

(71) Applicant: AIRBUS OPERATIONS LIMITED, Bristol (GB)

(72) Inventors: Robert Tangye, Bristol (GB); Cecile Lea Lourdes Garaygay, Bristol (GB); Nicholas Crane, Bristol (GB)

(73) Assignee: Airbus Operations Limited, Bristol (GB)

( * ) Notice: Subject to any disclaimer, the term of this patent is extended or adjusted under 35 U.S.C. 154(b) by 0 days.

(21) Appl. No.: 16/017,018

(22) Filed: Jun. 25, 2018

(65) Prior Publication Data

US 2019/0002091 A1 Jan. 3, 2019

(30) Foreign Application Priority Data

Jun. 27, 2017 (GB) .................................. 1710217.9

(51) Int. Cl.
*B64C 25/50* (2006.01)
*B64C 25/34* (2006.01)

(52) U.S. Cl.
CPC .............. *B64C 25/50* (2013.01); *B64C 25/34* (2013.01)

(58) Field of Classification Search
CPC ......... B64C 25/14; B64C 25/26; B64C 25/34; B64C 25/50
See application file for complete search history.

(56) References Cited

U.S. PATENT DOCUMENTS

| 5,482,228 A * | 1/1996 | Hoshino | B64C 25/16 244/102 A |
| 6,704,634 B1 * | 3/2004 | Gowan | B64C 25/10 244/100 R |
| 6,722,610 B1 * | 4/2004 | Rawdon | B62D 7/1509 244/103 W |
| 9,169,002 B2 * | 10/2015 | Benmoussa | B64C 25/50 |
| 2003/0125848 A1 * | 7/2003 | Otake | B64C 25/48 701/3 |
| 2006/0186267 A1 * | 8/2006 | Steiner | B60T 8/1703 244/110 A |
| 2006/0214063 A1 * | 9/2006 | Firuz | G05D 1/0083 244/175 |

(Continued)

FOREIGN PATENT DOCUMENTS

GB 650878 3/1951
GB 2480623 11/2011

*Primary Examiner* — Babar Sarwar
(74) *Attorney, Agent, or Firm* — Nixon & Vanderhye P.C.

(57) ABSTRACT

A control apparatus 300 for controlling a steering system 301 of an aircraft landing gear, the aircraft landing gear being configurable in a stowed configuration and a deployed configuration. The steering system 301 includes a wheel arrangement 202 including one or more wheels. The control apparatus 300 is arranged to perform a control process which includes: receiving one or more signals from one or more sensors 302a, 302b indicating a position of the wheel arrangement 202 when the landing gear is in the stowed configuration; determining whether a predetermined condition is satisfied in relation to the position of the wheel arrangement 202; and, in response to determining that the predetermined condition is satisfied, performing an adjustment process to control the steering system 301 to adjust the position of the wheel arrangement 202.

18 Claims, 7 Drawing Sheets

(56) References Cited

U.S. PATENT DOCUMENTS

| | | | |
|---|---|---|---|
| 2006/0293805 A1* | 12/2006 | Garcia | B60T 8/1703 |
| | | | 701/16 |
| 2007/0260365 A1 | 11/2007 | Furgal | |
| 2008/0188998 A1* | 8/2008 | Venios | G05D 1/0083 |
| | | | 701/3 |
| 2009/0210105 A1* | 8/2009 | Lusby | B64C 25/34 |
| | | | 701/15 |
| 2009/0261197 A1* | 10/2009 | Cox | B64C 25/36 |
| | | | 244/50 |
| 2012/0037752 A1* | 2/2012 | Collins | B64C 25/26 |
| | | | 244/102 SL |
| 2012/0330482 A1 | 12/2012 | Benmoussa | |
| 2013/0015290 A1* | 1/2013 | Benmoussa | B64C 25/30 |
| | | | 244/50 |
| 2013/0197739 A1* | 8/2013 | Gallagher | B64F 5/60 |
| | | | 701/31.5 |
| 2013/0233966 A1* | 9/2013 | Benmoussa | B64C 25/50 |
| | | | 244/50 |
| 2014/0156113 A1* | 6/2014 | Benmoussa | B64C 25/50 |
| | | | 701/3 |
| 2014/0156160 A1* | 6/2014 | DeVlieg | B60T 8/00 |
| | | | 701/70 |
| 2015/0291278 A1* | 10/2015 | Allwein | B64C 25/24 |
| | | | 244/102 A |
| 2016/0144983 A1* | 5/2016 | Thuong | G01M 17/00 |
| | | | 701/31.7 |
| 2016/0214720 A1* | 7/2016 | Hara | B64C 25/36 |
| 2017/0158316 A1* | 6/2017 | Sharpe | B64C 25/505 |
| 2019/0002091 A1* | 1/2019 | Tangye | B64C 25/14 |

\* cited by examiner

AIRCRAFT STEERING

This application claims priority to United Kingdom Patent Application GB1710217.9 filed on Jun. 27, 2017, the entirety of which is incorporated by reference.

TECHNICAL FIELD

The present invention relates to aircraft steering systems, and more particularly to apparatus and methods for controlling aircraft steering systems.

BACKGROUND

Aircraft often include steering systems to control the direction of movement of the aircraft when the aircraft is moving on the ground ("taxiing"). Typically, such steering systems include wheels forming part of a landing gear which is retracted into a landing gear bay after take-off and deployed from the landing gear bay prior to landing the aircraft. When on the ground, the aircraft is supported by the landing gear and moves by rotation of the landing gear wheels. In a common example, an aircraft includes a nose landing gear located under the aircraft nose and main landing gears located under the aircraft wings. The nose landing gear wheels are typically pivotable about a vertical axis to alter the direction of orientation of the nose landing gear wheels, thereby altering the direction of movement of the aircraft.

It is desirable that the steering system is correctly orientated (e.g. centered) when the aircraft lands, to correspond with the direction of travel of the aircraft at the point of landing. Deviation from the correct orientation may result in an uncomfortable or unsafe aircraft landing.

Typically, procedures for retraction of the landing gear include procedures for centering the nose landing gear prior to storing it in the landing gear bay. For example, sensor may detect that the a shock absorber on the landing gear is fully extended, indicating that the landing gear is not bearing the aircraft weight because the aircraft has left the ground, and automatically centre the landing gear wheels in response. However, the landing gear wheels may move away from the centre position due to, for example, equipment malfunction or accidental use of the steering control system during a flight, some aircraft include components to disable the steering system during the flight period, so as to prevent movement of the wheels. For example, some aircraft include a mechanically activated valve, known as a mechanical shut off valve, to isolate hydraulic actuators of the steering system from a source of hydraulic pressure. Such valves may be activated by a link arm or other structure which comes into contact with the valve when the landing gear is retracted. However, such valves add weight to the aircraft and increase costs.

SUMMARY

A first aspect of the invention provides a control apparatus for controlling a steering system of an aircraft landing gear, the aircraft landing gear being configurable in a stowed configuration in which the aircraft landing gear is stowed in a landing gear bay of the aircraft, and a deployed configuration, in which the landing gear is deployed outside of the landing gear bay, the steering system comprising a wheel arrangement including one or more wheels, wherein the control apparatus is arranged to perform a control process comprising: receiving one or more signals from one or more sensors indicating a position of the wheel arrangement when the landing gear is in the stowed configuration; determining whether a predetermined condition is satisfied in relation to the position of the wheel arrangement; and in response to determining that the predetermined condition is satisfied, performing an adjustment process to control the steering system to adjust the position of the wheel arrangement.

Optionally, the predetermined condition is that the position of the one or more wheels is greater than a threshold value away from a centre position of the wheel arrangement.

Optionally, the adjustment process is to move the position of the wheel arrangement towards a centre position.

Optionally, the control apparatus is arranged to perform the control process in response to a command to deploy the landing gear.

Optionally, the control apparatus is arranged to perform the control process continuously or intermittently during a flight period of the aircraft, during which the aircraft landing gear is in the stowed configuration.

Optionally, the control process comprises activating the steering system in response to determining that the predetermined condition is satisfied.

Optionally, the control process comprises maintaining activation of the steering system during substantially the whole of the flight period.

A second aspect of the control process provides an aircraft landing gear control system comprising a control apparatus according to the first aspect, and the steering system, the steering system being a hydraulic steering system comprising hydraulic actuators to rotate the one or more wheels.

Optionally, the hydraulic steering system does not include a mechanically activated valve to isolate the hydraulic actuators from a source of hydraulic pressure to the hydraulic actuators.

Optionally, the aircraft landing gear control system comprises the one or more sensors, wherein the or each sensor comprises a variable differential transducer.

A third aspect of the invention provides an aircraft comprising the aircraft landing gear according to the second aspect.

A fourth aspect of the invention provides a method for controlling a steering system of an aircraft landing gear, the aircraft landing gear being configurable in a stowed configuration in which the aircraft landing gear is stowed into a landing gear bay of the aircraft, and a deployed configuration, in which the landing gear is deployed outside of the landing gear bay, the steering system comprising a wheel arrangement including one or more wheels, wherein the method comprises: receiving one or more signals from one or more sensors indicating a position of the wheel arrangement when the landing gear is in the stowed configuration; determining whether a predetermined condition is satisfied in relation to the position of the wheel arrangement; and in response to determining that the predetermined condition is satisfied, performing an adjustment process to control the steering system to adjust the position of the wheel arrangement.

Optionally, the predetermined condition is that the position of the one or more wheels is greater than a threshold value away from a centre position of the wheel arrangement.

Optionally, the adjustment process is to move the position of the wheel arrangement towards a centre position.

Optionally, the method comprises performing the control process in response to a command to deploy the landing gear.

Optionally, the method comprises performing the control process continuously or intermittently during a flight period of the aircraft, during which the aircraft landing gear is in the stowed configuration.

Optionally, the method comprises activating the steering system in response to determining that the predetermined condition is satisfied.

Optionally, the method comprises activating the steering apparatus during substantially the whole of the flight period.

A fifth aspect of the invention provides a computer program comprising computer-executable instructions to perform a method the fourth aspect.

A sixth aspect of the invention provides apparatus for maintaining a centre position of a steering system of an aircraft landing gear, the apparatus being configured to: receive one or more signals from one or more sensors indicating whether the steering system is in the centre position during a period when the landing gear is retracted in a landing gear bay of the aircraft; and in the case that the one or more signals indicated that the wheel arrangement is not in the centre position, control the steering system to re-centre the steering system.

BRIEF DESCRIPTION OF THE DRAWINGS

Embodiments of the invention will now be described, by way of example only, with reference to the accompanying drawings, in which.

DETAILED DESCRIPTION

Figure 1:
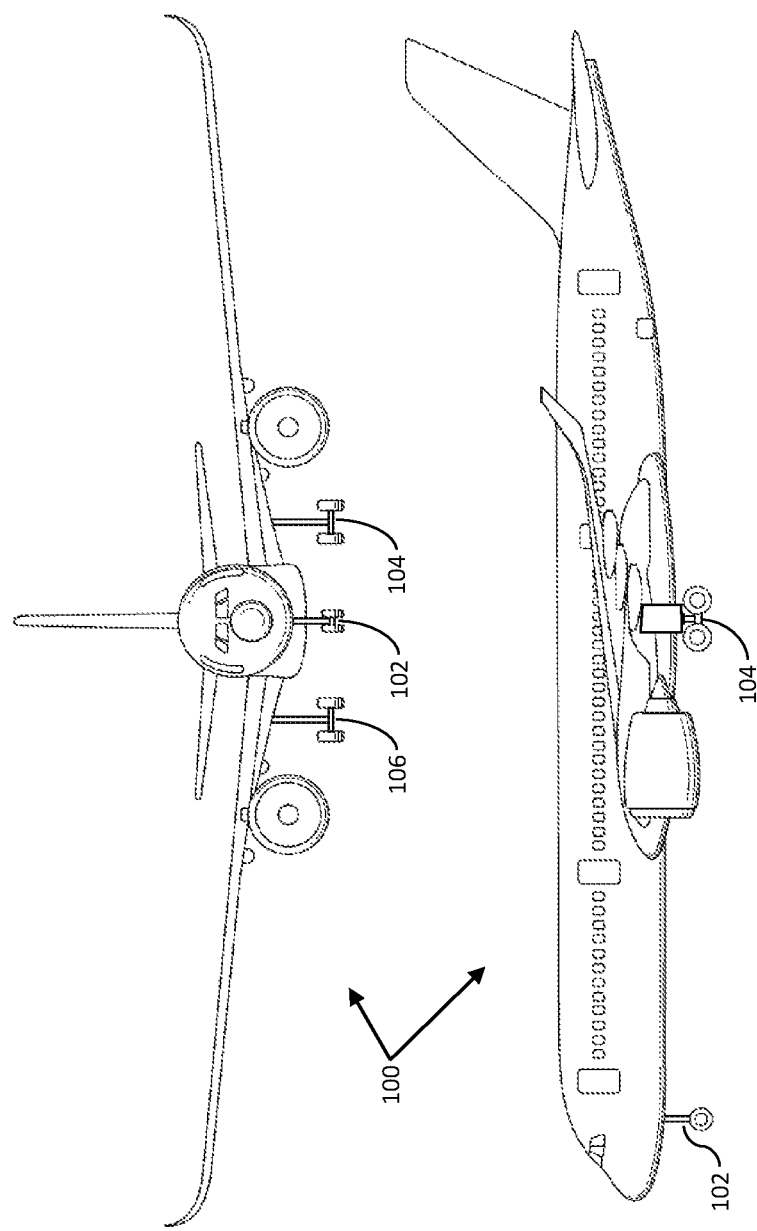
FIG. 1 is a schematic diagram showing side and front views of an aircraft of an embodiment of the invention.

FIG. 1 illustrates front and side elevations of an exemplary aircraft 100, in which embodiments of the present invention may be implemented. Three sets of landing gear are illustrated: nose 102, main left 104 and main right 106. Typically, the wheels of the nose landing gear (NLG) 102 are rotatable about a vertical axis in order to steer (change the direction of movement) of the aircraft when it is traveling on the ground.

Figure 2A:
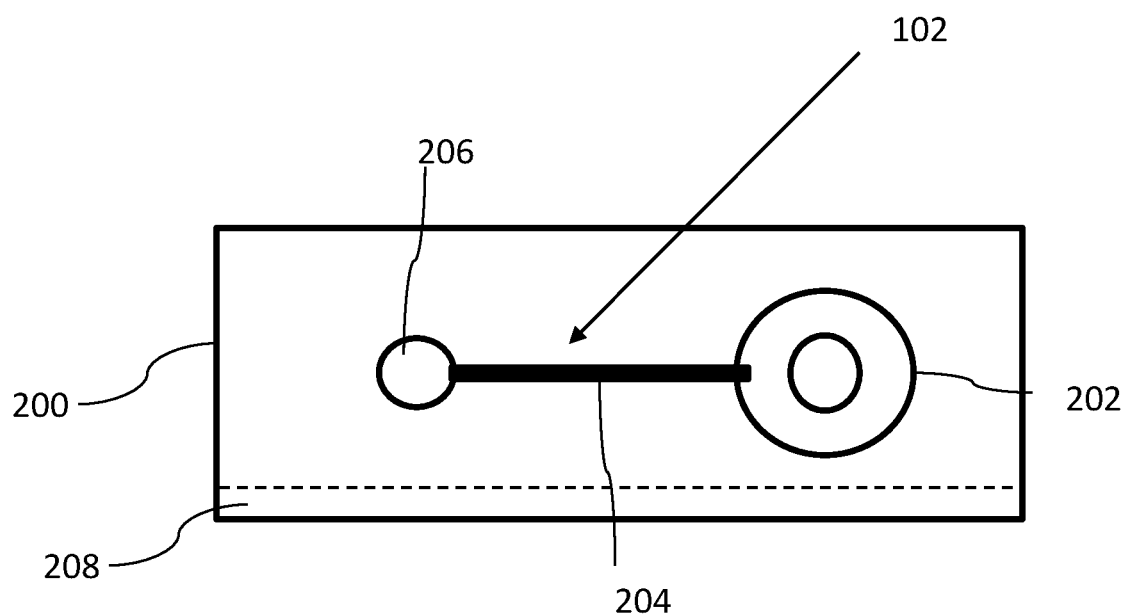
FIG. 2a is a schematic diagram of a landing gear bay and landing gear of the aircraft with the landing gear in a stowed configuration.
Figure 2B:
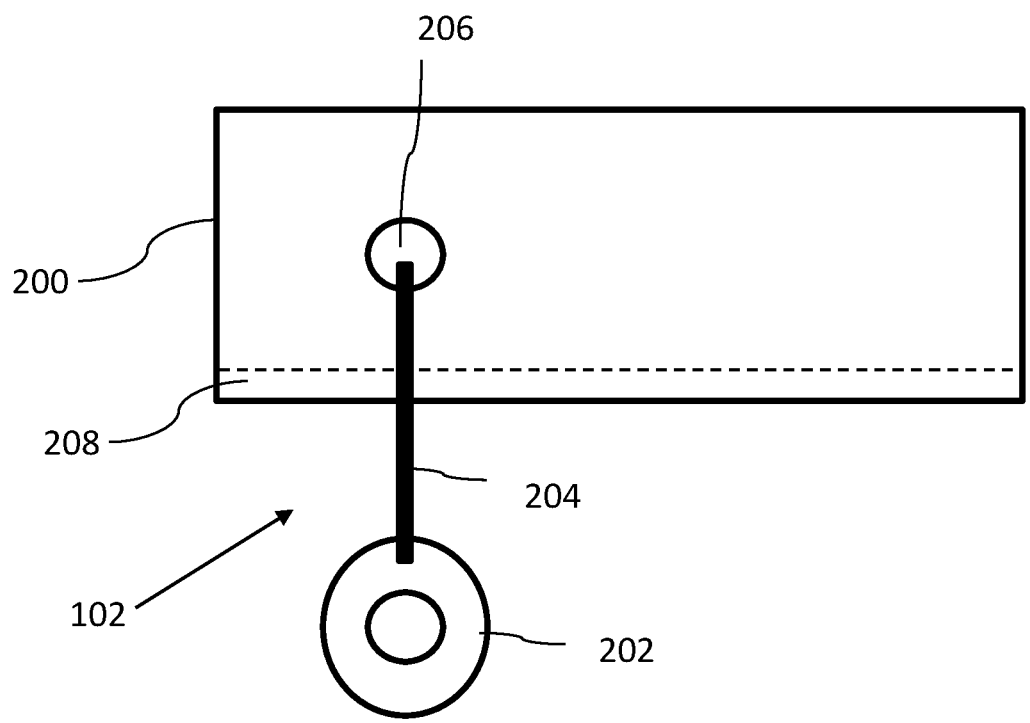
FIG. 2b is a schematic diagram of the landing gear bay and the landing gear with the landing gear in a deployed configuration.

FIGS. 2a and 2b illustrate simplified schematic side elevations of a landing gear bay 200 and a NLG 102 in which embodiments of the invention may be implemented. The NLG 102 comprises a wheel arrangement 202, and a landing gear leg 204 which connects the wheel to a pivot point 206 in the landing gear bay 200. FIG. 2a illustrates the NLG 102 in a stowed (retracted) configuration in which the NLG 102 is stowed into the landing gear bay 200. FIG. 2b illustrates the NLG 102 in a deployed (extended) configuration in which the NLG 102 is deployed outside of the landing gear bay 200. The landing gear bay 200 includes an aperture 208 through which the NLG 102 may move between the stowed configuration of FIG. 2a and the deployed configuration of FIG. 2b by pivoting about the pivot point 206. The landing gear bay 200 may include a door (not shown) which can be opened to allow the NLG 102 to move between the stowed and deployed configurations but which is closed at other times. The movement between the deployed and stowed configurations may be driven by a hydraulic or electric system, for example.

The NLG 102 is typically retracted to the stowed configuration after the aircraft 100 leaves the ground and maintained in the stowed configuration until a time shortly before the aircraft 100 lands. Maintaining the NLG 102 in the stowed configuration while the aircraft is flying reduces air resistance, providing benefits such as improved fuel efficiency.

Figure 2C:
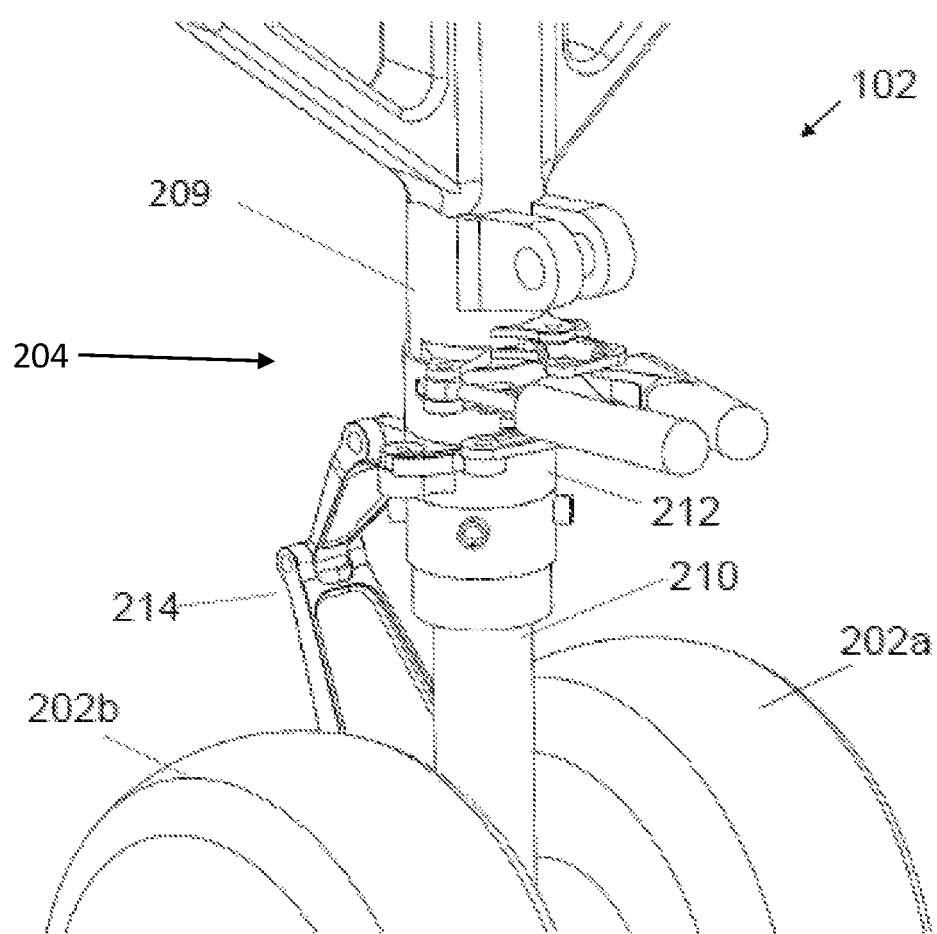
FIG. 2c is a schematic perspective view of a landing gear of the aircraft.

FIG. 2c shows a perspective view of the NLG 102. As shown, the landing gear leg 204 of the NLG 102 comprises a main fitting 209 with an upper end connecting to the aircraft structure, for example to the pivot point 206 (not shown in FIG. 2c). The lower end of the landing gear leg 204 is connected to a right wheel 202a and a left wheel 202b of the wheel arrangement 202 via an axle or axles (not shown in FIG. 2c). The landing gear leg 204 includes a slider 210 at its lower end able rotate inside the main fitting 209. A steering collar 212 is rotatably mounted on the outside of the main fitting 209 at its lower end. Torque links 214 are coupled between the steering collar 214 and the slider 210 such that the slider 210 rotates inside the main fitting as the steering collar rotates about the main fitting 209. The slider is mounted to the wheel axle or axles and rotation of the slider therefore results in rotation of the wheel arrangement 202 to steer the aircraft.

Figure 2D:
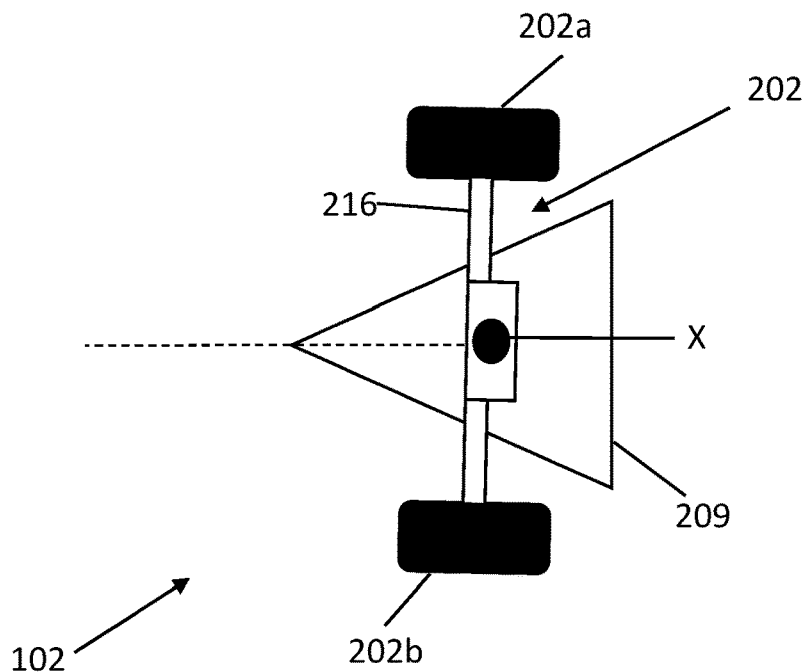
FIG. 2d is a schematic plan view of the landing gear with a wheel arrangement of the landing gear aligned in a centre position.
Figure 2E:
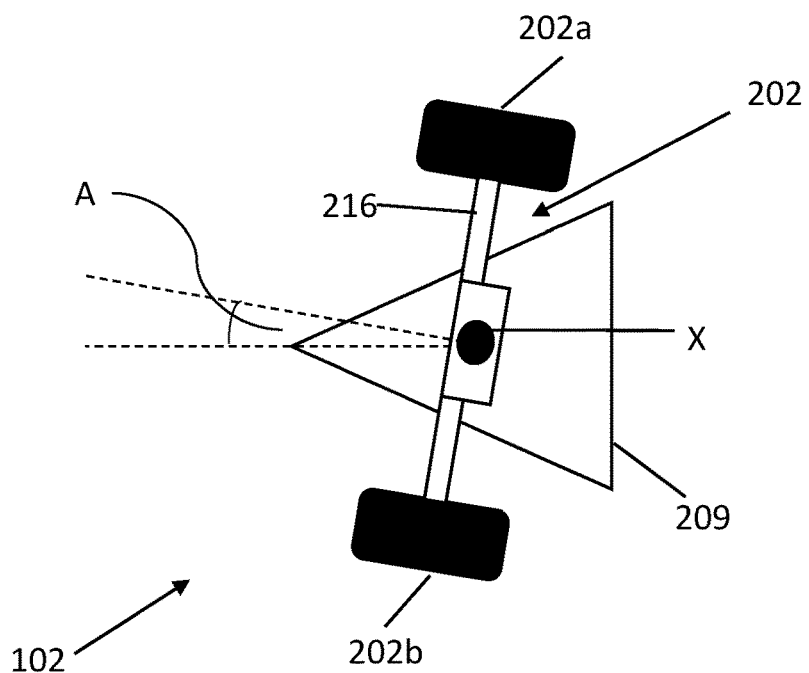
FIG. 2e is a schematic plan view of the landing gear with the wheel arrangement in an off-centre position.

FIG. 2d and FIG. 2e illustrate schematic plan views of the NLG 102. As shown, the wheel arrangement in this example includes the right wheel 202a and left wheel 202b, and an axis 216 on which the right wheel 202a and the left wheel 202b are rotatably mounted. FIG. 2d illustrates the NLG 102 with the wheel arrangement 202 centered i.e. aligned so that the aircraft travels in a straight line (indicated by the horizontal dashed line). FIG. 2e shows the NLG 102 with the wheel arrangement 202 rotated away from the centre about point X (corresponding to and lying on the landing gear arm 204) by an angle A.

Figure 3:
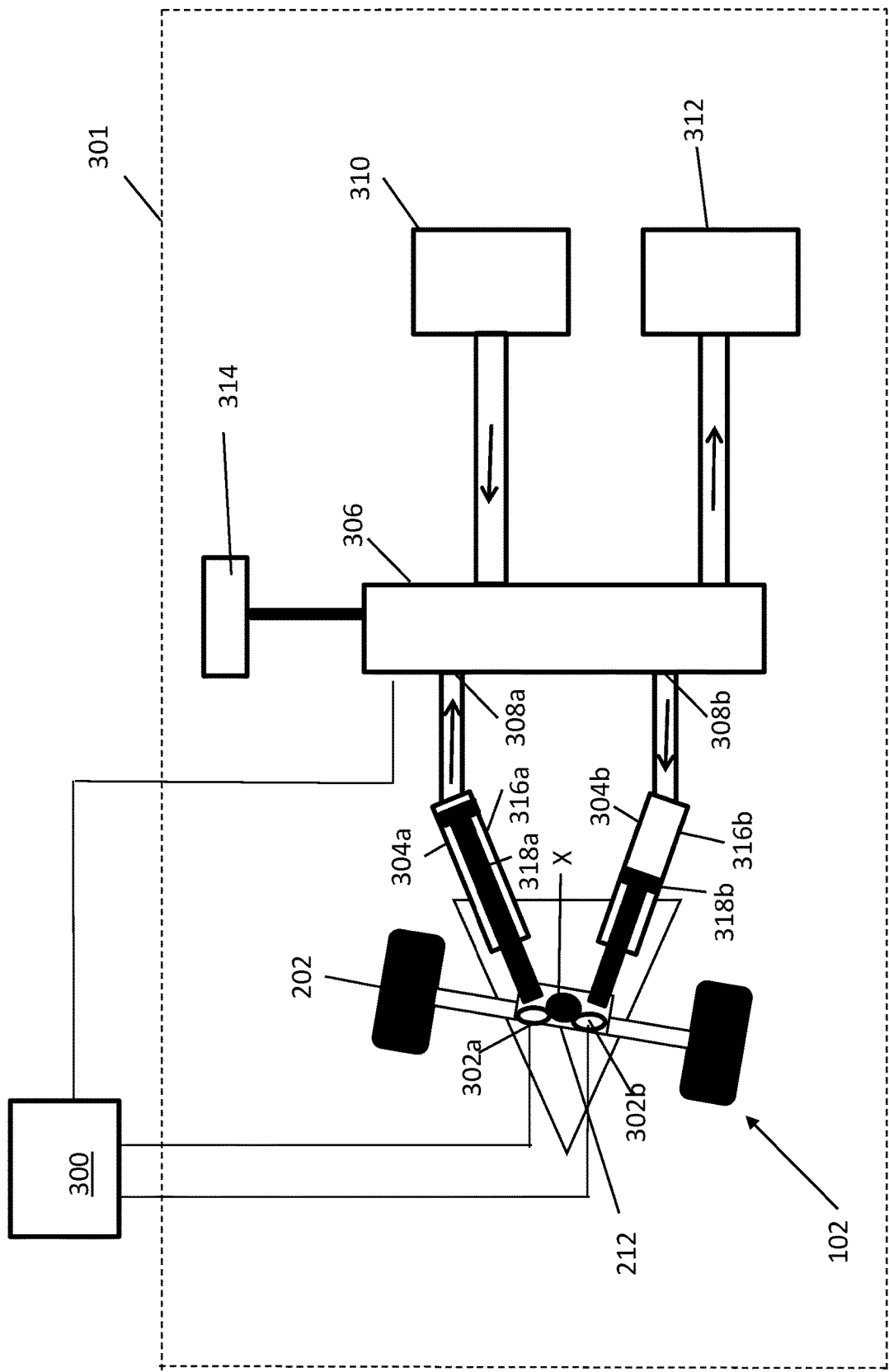
FIG. 3 is a schematic diagram of a steering system and controller according to an embodiment of the invention.

FIG. 3 is a schematic diagram illustrating a controller 300 and a steering system 301 in accordance with an embodiment. The steering system 301 comprises the NLG 102 and various components of a steering system arranged to rotate the wheel arrangement 202 of the NLG 102. The controller 300 is an apparatus arranged to control the operation of the steering system in response to signals received from sensors 302a, 302b indicating a position (alignment) of the wheel arrangement 202, as will be described in more detail below.

The steering system 301 in the present example includes various hydraulic components, including a right actuator 304a, a left actuator 304b, a metering valve 306 including a right port 308a and a left port 308b, a hydraulic pressure supply system 310, a hydraulic return system 312 and a steering controller 314.

The hydraulic pressure supply system 310 may include a source of hydraulic pressure provided, for example, by a pump powered by an engine of the aircraft 100, manifolds and/or other components configured to route pressurised hydraulic fluid towards other components of the steering system 301. The hydraulic return system 312 may include manifolds and/or other components to route hydraulic fluid to a hydraulic fluid reservoir, for example.

The metering valve 306 is configured to route hydraulic fluid from the hydraulic pressure supply system 310 selectively to the right actuator 304a or the left actuator 304b, under the control of the controller 300 and/or the steering controller 314, thereby causing the wheel arrangement 202 to rotate about the point X, as is described in more detail below.

The steering controller 314 is typically located in a flight deck of the aircraft 100 and enables, for example, manual control of the steering system 301. The steering controller 314 may comprise a wheel, tiller or joystick, for example, with mechanical, electrical or hydraulic connections transmitting the steering controller 314 input movement to a steering control unit.

The controller 300 is typically a computerised device, and may form part of an avionic system of the aircraft 100, for example. The controller is connected via wired or unwired electronic connections to the meter valve 306 and the sensors 302a, 302b.

FIG. 3 illustrates an example in which the metering valve 306 has received input from the controller 300 or the steering controller 314 to rotate the wheel arrangement 202 to the right. As shown by the arrows in FIG. 3, pressured fluid from the hydraulic pressure supply system 310 is directed into a line leading to the metering valve 306. The metering valve 306 routes the pressurised fluid out of the left port 308b of the metering valve 306 to the left actuator 304b. Each of the actuators 304a, 304b comprises a cylinder 316a, 316b in which a piston 316 is slidably mounted with one end of each piston connected to a rotable component on the NLG 102, such as the steering collar 212. The fluid pressure from the meter valve 306 directed to the left actuator 304b drives the piston 304b to move so as to push the steering collar 212 (or other component) and thereby compel the wheel arrangement 202 to the right. As the wheel arrangement 202 turns, hydraulic fluid is forced out of the right actuator 304a to the metering valve 306, from where it is routed to the hydraulic return system 312. It will be appreciated that by the metering valve 306 routing pressurised hydraulic fluid out of the right port 308a instead of the left port 308b, the wheel arrangement 202 can similarly be turned to the left.

The wheel arrangement 202 is typically centred prior to the NLG 102 being retracted into the landing gear bay 200, under the control of the controller 300, for example. However, the wheel arrangement 202 may move away from the centre position due to, for example, equipment malfunction or accidental use of the steering controller 314 during a flight. In embodiments of the present invention, the controller 300 is arranged to perform a control process to adjust the position of the wheel arrangement 102 on the basis one or more signals received from one or more of the sensors 302a, 302b.

Figure 4:
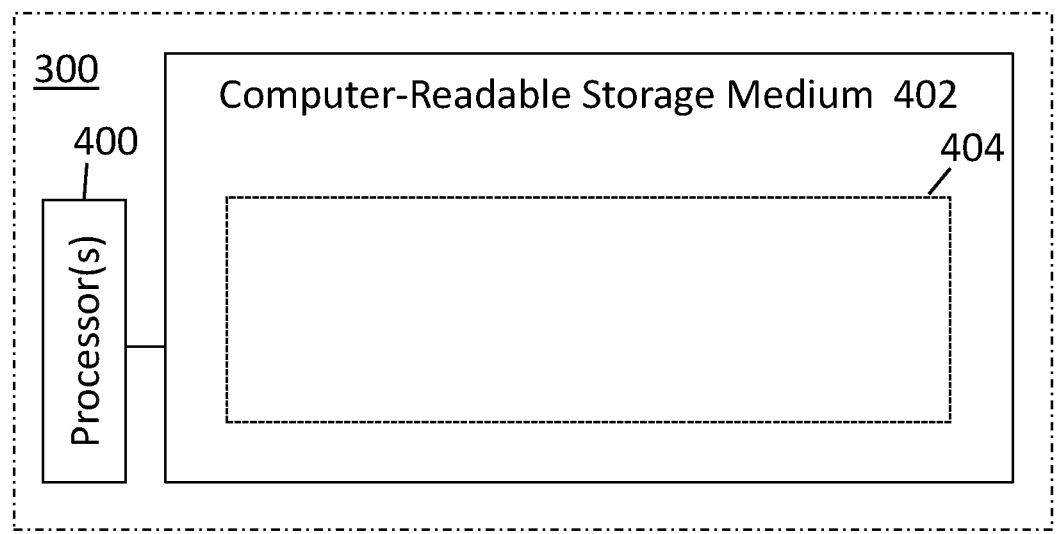
FIG. 4 is a block diagram of the controller.

As mentioned above, the controller 300 may be a computerised device. FIG. 4 shows a schematic diagram of an example controller 300. The controller includes one or more processors 400 and a non-transitory computer-readable storage medium 402 including instructions 404 in the form of a computer program that, when executed by the one or more processors 400, cause the one or more processors 400 to perform a method according to an embodiment of the present invention. The non-transitory computer-readable storage medium may comprise a Read Only Memory (ROM) or Random Access Memory (RAM), for example.

The sensors 302a, 302b are arranged to determine a position (e.g. alignment or angular position) of the wheel arrangement 202. Each of the sensors 302a, 302b may be a steering angle sensor, such as a rotary variable differential transducer, for example.

Figure 5:
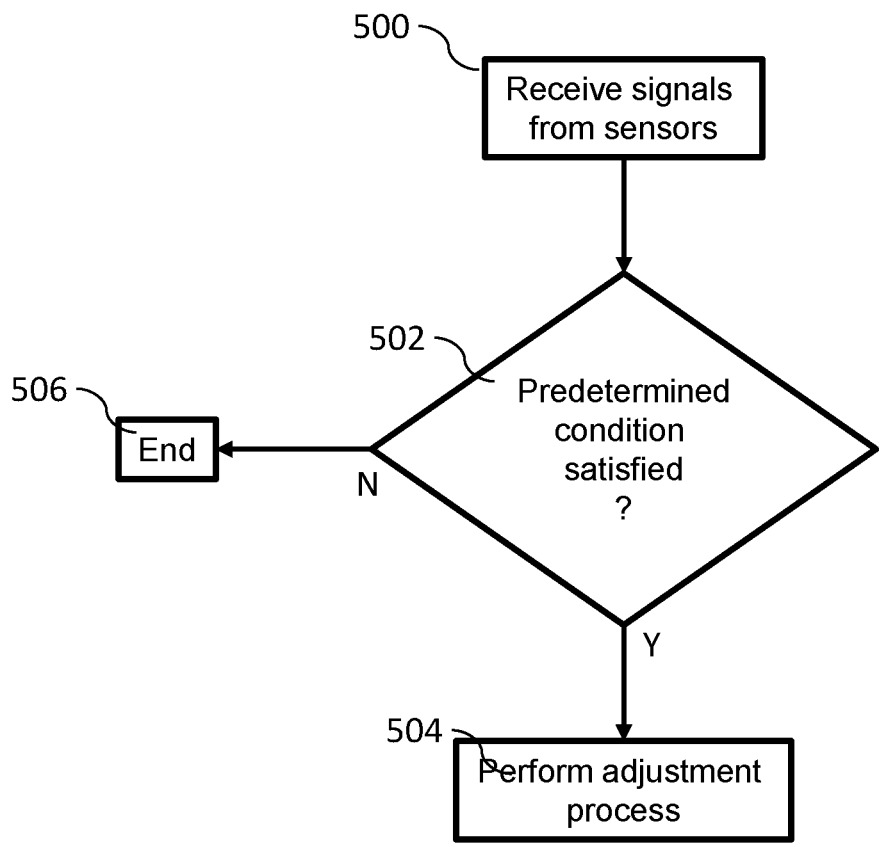
FIG. 5 is a flow diagram showing a control process in accordance with a first embodiment.

FIG. 5 is a flow diagram illustrating a control process performed by the controller 300 in a first embodiment. At step 500, the controller receives one or more signals from one or more of the sensors 302a, 302b indicating a position of the wheel arrangement 202 when the NLG 102 is in the stowed configuration.

At step 502, the controller 300 determines whether a predetermined condition is satisfied in relation to a position of the wheel arrangement 202. For example, the predetermined condition may be that the position of the wheel arrangement 202 is greater than a threshold value (e.g. 1.5 degrees or 2 degrees) away from a centre position (i.e. that the magnitude of the angle A shown in FIG. 2e is greater than a threshold value).

If the predetermined condition is satisfied, the controller 300 performs an adjustment process to control the steering system 301 to adjust the position of the wheel arrangement 202 at step 504. This may involve implementing processes as described above in relation to FIG. 3, for example. The adjustment process may be a centering process to return the wheel arrangement 202 to or near the centre position. The controller 300 may monitor the position of the wheel arrangement 202 based on signals received from the sensors 202a, 202b during the adjustment process and end the process once the wheel arrangement 202 is at or near the centre position.

If the predetermined condition is not satisfied, the process ends at step 506.

Figure 6:
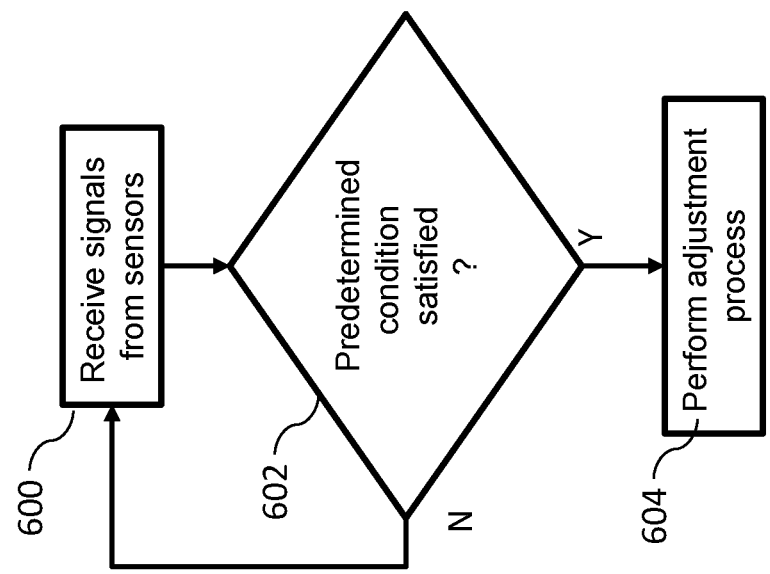
FIG. 6 is a flow diagram showing a control process in accordance with a second embodiment.

In some embodiments, the controller 300 performs the control process continuously or intermittently during a flight period of the aircraft 100, during which the NLG 102 is in the stowed configuration. FIG. 6 is a flow diagram illustrating an example. Steps 600, 602 and 604 are the same as steps 500, 502 and 504 respectively. However, in the case that it is determined at step 602 that the predetermined condition is not satisfied, the process returns to step 600. In this way, the position of the wheel arrangement 202 may be continuously monitored, so that the wheel arrangement 202 may be recentred substantially immediately it moves by more than the threshold value. In some embodiments, the controller 300 may wait, for a predetermined time period for example, after the determination at step 602 that the predetermined condition is not met, before receiving and processing further signals from the sensors 302a, 302b, so that the control process is performed intermittently, for example periodically, while the NLG 102 is in the stowed configuration.

Figure 7:
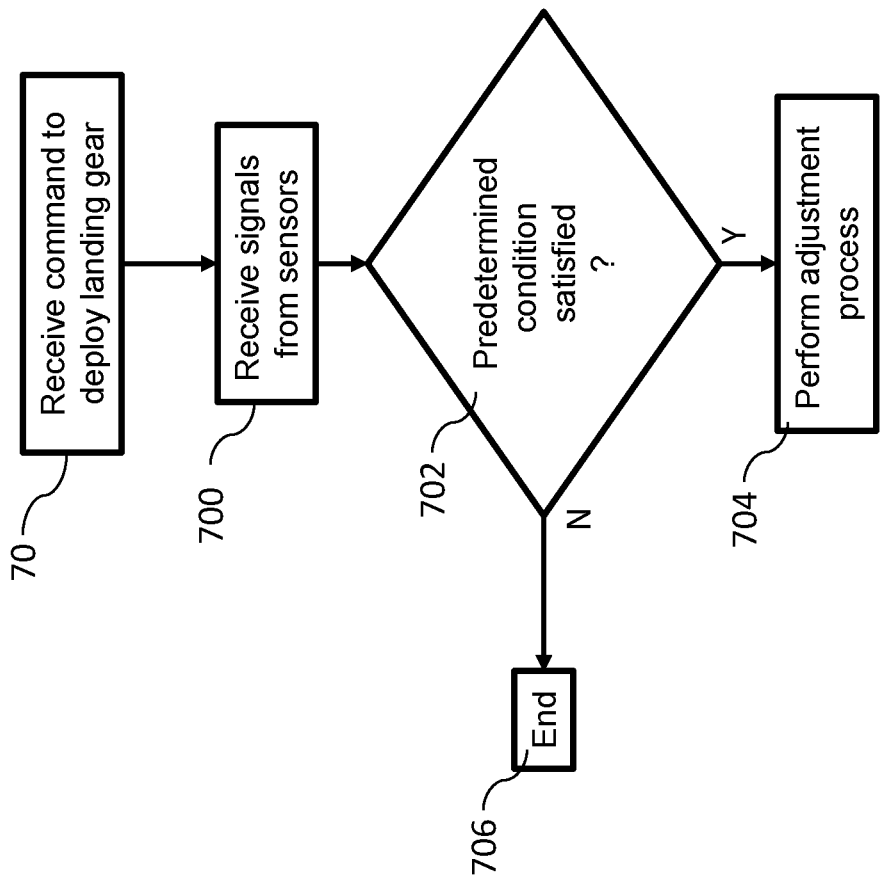
FIG. 7 is a flow diagram showing a control process in accordance with a third embodiment.

In some embodiments, the control process is performed as part of a process to deploy the NLG 102, as part of an aircraft landing procedure for example. FIG. 7 is a flow diagram illustrating an example. At step 70, the controller 300 receives a command to deploy the landing gear. The command may be received in response to an input from the flight deck, for example. In response to receipt of the command, the controller 300 then performs steps a control process as described above in relation to FIG. 5 for example, before deploying the landing gear. Steps 700, 702, 704 and 706 in FIG. 7 are the same as steps 500, 502, 504 and 506, respectively. The control process may thus be performed as a one-time process immediately prior to landing. This avoids repeated use of the controller 300 and steering system 301, saving computing and power resources.

According to the above embodiments, the controller 300 and steering system 301 act as a landing gear control system to inhibit or prevent misalignment (an-off centre alignment) of the wheel arrangement 202 at aircraft landing, without the use of mechanical or other safety valves, thereby reducing the number of components required for the steering system. However, in some embodiments one or more safety valves may be included. For example, an electric shut off valve may be provided, on the line between the electric power supply system 310 and the metering valve 306 for example, to isolate the actuators 302a, 302b from the hydraulic power supply system 310. The electric shut off valve may be controllable by the controller 300 or by manual input. In one example, the electric shut off valve may be automatically closed in response to the NLG 102 being retracted into the landing gear bay 200. This may further inhibit misalignment of the wheel arrangement 202. In this case, the control process may be performed in the case wheel arrangement 202 is misaligned due to, for example, the electric shut off valve being opened due to human error, or a false determination that the aircraft has landed. In the event that the electric shut off valve is closed when, during the control process, the predetermined condition is determined to be met, the adjustment process includes opening the valve, thereby powering the steering system.

The above embodiments are to be understood as illustrative examples of the invention. For example, while a hydraulic steering system 301 was described above, embodiments of the invention may be implemented using an electric or other type of steering system. Further, while in above embodiments the wheel arrangement 202 includes two wheels 202a, 202b, in other embodiments wheel arrangements including only one wheel or more than two wheels, may be used.

It is to noted that the term "or" as used herein is to be interpreted to mean "and/or", unless expressly stated otherwise.

It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the invention, which is defined in the accompanying claims.

The invention claimed is:

1. A control apparatus for controlling a steering system of an aircraft landing gear, the aircraft landing gear being configurable in a stowed configuration in which the aircraft landing gear is stowed in a landing gear bay of the aircraft, and a deployed configuration, in which the landing gear is deployed outside of the landing gear bay, the steering system comprising a wheel arrangement including one or more wheels, wherein the control apparatus is arranged to perform a control process comprising:
   receiving one or more signals from one or more sensors indicating a position of the wheel arrangement while the landing gear is in the stowed configuration;
   determining whether a predetermined condition is satisfied in relation to the position of the wheel arrangement, while the landing gear is in the stowed configuration; and
   in response to determining that the predetermined condition is satisfied, performing an adjustment process to control the steering system to adjust the position of the wheel arrangement, while the landing gear is in the stowed configuration.

2. The control apparatus according to claim 1, wherein the predetermined condition is that the position of the one or more wheels is greater than a threshold value away from a center position of the wheel arrangement.

3. The control apparatus according to claim 1, wherein the adjustment process incudes moving the position of the wheel arrangement towards a center position.

4. The control apparatus according to claim 1, wherein the control apparatus performs the control process in response to a command to deploy the landing gear from the stowed configuration to the deployed configuration.

5. The control apparatus according to claim 1, wherein the control apparatus performs the control process continuously or intermittently during a flight period of the aircraft, during which flight period the aircraft landing gear is in the stowed configuration.

6. The control apparatus according to claim 5, wherein the control process comprises activating the steering system in response to determining that the predetermined condition is satisfied.

7. The control apparatus according to claim 5, wherein the control process comprises maintaining activation of the steering system during substantially the whole of the flight period.

8. An aircraft landing gear control system comprising:
   a control apparatus according to claim 1, and
   the steering system being a hydraulic steering system comprising hydraulic actuators to rotate the one or more wheels.

9. The aircraft landing gear control system according to claim 8, wherein the hydraulic steering system does not include a mechanically activated valve to isolate the hydraulic actuators from a source of hydraulic pressure to the hydraulic actuators.

10. The aircraft landing gear control system according to claim 8, comprising the one or more sensors, wherein each of the one or more sensors comprises a variable differential transducer.

11. A method for controlling a steering system of an aircraft landing gear, the aircraft landing gear being configurable in a stowed configuration in which the aircraft landing gear is stowed into a landing gear bay of the aircraft, and a deployed configuration, in which the landing gear is deployed outside of the landing gear bay, the steering system comprising a wheel arrangement including one or more wheels, wherein the method comprises:
   receiving one or more signals from one or more sensors indicating a position of the wheel arrangement;
   determining whether a predetermined condition is satisfied in relation to the position of the wheel arrangement, while the landing gear is in the stowed configuration; and
   in response to determining that the predetermined condition is satisfied, performing an adjustment process to control the steering system to adjust the position of the wheel arrangement, while the landing gear is in the stowed configuration.

12. The method according to claim 11, wherein the predetermined condition is that the position of the one or more wheels is greater than a threshold value away from a center position of the wheel arrangement.

13. The method according to claim 11, wherein the adjustment process is to move the position of the wheel arrangement towards a center position.

14. The method according to claim 11, comprising performing the control process in response to a command to deploy the landing gear from the stowed configuration to the deployed configuration.

15. The method according to claim 11, comprising performing the control process continuously or intermittently during a flight period of the aircraft, during which flight period the aircraft landing gear is in the stowed configuration.

16. The method according to claim 15, wherein the control process includes activating the steering system in response to determining that the predetermined condition is satisfied.

17. The method according to claim 15, comprising activating the steering apparatus during substantially the whole of the flight period.

18. An apparatus for maintaining a center position of a steering system of an aircraft landing gear, the apparatus being configured to:
   receive one or more signals from one or more sensors indicating whether the steering system is in the center position while the landing gear is retracted in a landing gear bay of the aircraft; and
   in response to the one or more signals indicating that the wheel arrangement is not in the center position, control the steering system to re-center the steering system, while the landing gear is retracted in the landing gear bay.

* * * * *